(12) United States Patent
Katagiyama et al.

(10) Patent No.: US 7,507,032 B2
(45) Date of Patent: Mar. 24, 2009

(54) OPTICAL CONNECTION COMPONENT WHICH HAS A SHUTTER MEMBER AND WHICH CAN BE REDUCED IN SIZE

(75) Inventors: Naoki Katagiyama, Tokyo (JP); Yuichi Koreeda, Tokyo (JP); Yasutaka Hiroki, Tokyo (JP); Akihiro Onogawa, Tokyo (JP)

(73) Assignee: Japan Aviation Industry, Limited, Tokyo (JP)

( * ) Notice: Subject to any disclaimer, the term of this patent is extended or adjusted under 35 U.S.C. 154(b) by 0 days.

(21) Appl. No.: 11/821,885

(22) Filed: Jun. 26, 2007

(65) Prior Publication Data
US 2008/0013148 A1    Jan. 17, 2008

(30) Foreign Application Priority Data
Jul. 12, 2006    (JP)    ............... 2006-191052

(51) Int. Cl.
*G02B 6/36* (2006.01)
*G02B 6/38* (2006.01)

(52) U.S. Cl. .................. 385/73; 385/58; 385/70; 385/75; 385/76; 385/92

(58) Field of Classification Search .............. 385/53–94
See application file for complete search history.

(56) References Cited

U.S. PATENT DOCUMENTS 6,461,054 B1   10/2002   Iwase

| 6,688,780 B2* | 2/2004 | Duran | 385/76 |
|---|---|---|---|
| 2003/0103732 A1* | 6/2003 | Yang et al. | 385/76 |
| 2004/0062486 A1* | 4/2004 | Tanaka et al. | 385/55 |
| 2007/0098330 A1 | 5/2007 | Ozawa et al. | |

FOREIGN PATENT DOCUMENTS

| JP | 9-211264 | 8/1997 |
|---|---|---|
| JP | 10-148730 | 6/1998 |
| JP | 2001-194562 | 7/2001 |
| JP | 2002 243978 | 8/2002 |
| JP | 2004-361503 | 12/2004 |
| JP | 2005-062580 | 3/2005 |
| JP | 2007-121614 | 5/2007 |

OTHER PUBLICATIONS

Japanese Office Action dated Apr. 16, 2008.
Translation of the relevant part of Japanese Office Action dated Apr. 16, 2008.
Japanese Office Action dated Jul. 30, 2008.

* cited by examiner

*Primary Examiner*—Sung H Pak
*Assistant Examiner*—Daniel Petkovsek
(74) *Attorney, Agent, or Firm*—Collard & Roe, P.C.

(57) ABSTRACT

In an optical connection component for use in connecting a connection object having a key formed on one side surface thereof, a housing for fitting over the connection object is formed around an optical axis. A shutter member is coupled to the housing and includes a light shielding portion which is elastically deformable and extends across the optical axis. The housing includes a key groove portion for receiving the key and an escape groove portion adapted to receive the light shielding potion in an elastically deformed state.

7 Claims, 7 Drawing Sheets

OPTICAL CONNECTION COMPONENT WHICH HAS A SHUTTER MEMBER AND WHICH CAN BE REDUCED IN SIZE

This application is based upon and claims the benefit of priority from Japanese patent application No. 2006-191052, filed on Jul. 12, 2006, the disclosure of which is incorporated herein in its entirety by reference.

BACKGROUND OF THE INVENTION

This invention relates to an optical component such as an optical connector and an adapter for use therewith and, in particular, to an optical component having a shutter member for preventing accidental emission of light. The optical component, namely, the optical connector and the adapter will collectively be called herein an optical connection connector.

An adapter of the type is disclosed in Japanese Unexamined Patent Application Publication (JP-A) No. H9(1997)-211264. The adapter comprises a housing having first and second fitting ends each of which is adapted to be fitted to an optical connector. The housing is provided with a shutter member disposed therein. The shutter member is attached to the housing in the vicinity of the first fitting end and extends across an optical axis within the housing towards the second fitting end.

Even if light is accidentally emitted from an optical connector in the state where the optical connector is fitted to the second fitting end, the light is blocked by the shutter member and is not emitted out of the adapter. If another optical connector is fitted to the first fitting end, the shutter member is pressed by the other connector and deformed to be deviated from the optical axis. Thus, the optical connectors can be optically connected to each other.

Another adapter of the type is disclosed in Japanese Unexamined Patent Application Publication (JP-A) No. 2002-243978. In the adapter, a part of a shutter member is embedded in a wall portion.

SUMMARY OF THE INVENTION

When the optical connectors are optically connected by the use of the above-mentioned adapter, a light shielding portion of the shutter member is pressed by the connector and deformed to be received in a gap between the connector and the adapter. In other words, a space is required between the connector and the adapter to receive the light shielding portion of the shutter member. Accordingly, the adapter is inevitably designed with a large size due to the above-mentioned space.

In case where a whole of the shutter member is disposed inside the adapter, the adapter is further increased in size.

Also, in case where a part of the shutter member is embedded in the wall portion of the adapter, it is difficult to reduce the size of the adapter.

It is therefore an exemplary object of this invention to provide an optical connection component which has a shutter member and which is not increased in size.

Other objects of the present invention will become clear as the description proceeds.

According to an exemplary aspect of the invention, there is provided an optical connection component which is for use in connecting a connection object comprising a key formed on one side surface and which has an optical axis, the optical connection component comprising a housing which is formed around the optical axis and is for fitting over the connection object and a shutter member coupled to the housing, the shutter member comprising a light shielding portion which is elastically deformable and extends across the optical axis, the housing comprising a key groove portion for receiving the key and an escape groove portion adapted to receive the light shielding potion in an elastically deformed state.

DESCRIPTION OF THE PREFERRED EMBODIMENT

Figure 1:
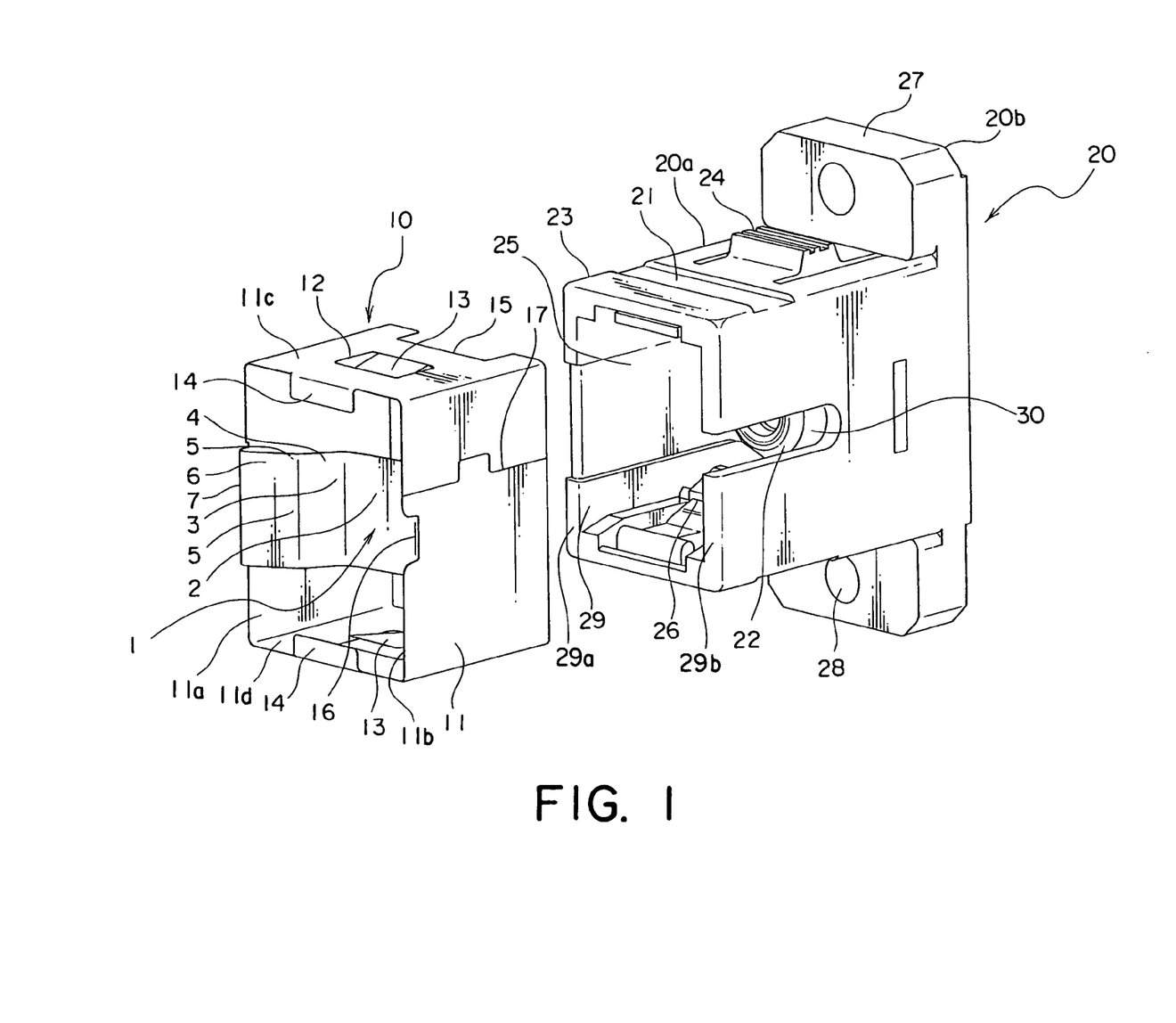
FIG. 1 is an exploded perspective view of an adapter as an optical connection component according to an exemplary embodiment of this invention.

Referring to FIG. 1, description will be made of a structure of an optical connection component according to an exemplary embodiment of this invention.

Figure 7:
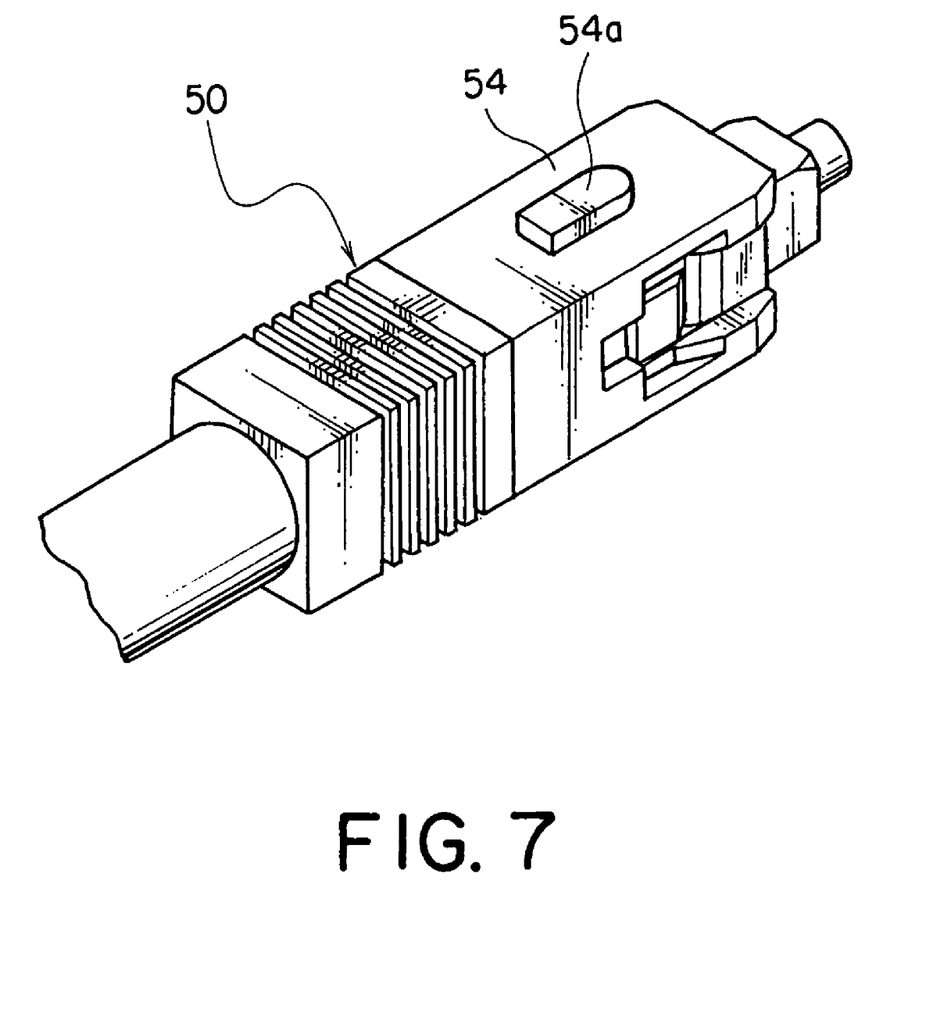
FIG. 7 is a perspective view of a typical optical connector plug.

The optical connection component illustrated in the figure is a so-called adapter which is for use in connecting, as connection objects, first and second optical connector plugs each of which is connected to an optical fiber for optical communication. Each of the first and the second optical connector plugs has a key 54a formed on an outer surface of a housing 54, as in a typical example depicted by 50 in FIG. 7.

The adapter comprises an adapter body 20 and a shutter member 10 fitted and attached around a front part of the adapter body 20. The adapter body 20 comprises a housing 20a having a generally rectangular section and provided with a fitting portion 29 extending in a given direction parallel to an optical axis of the adapter, and a flange 20b extending upward and downward from a rear end of the housing 20a. The given direction will be referred hereinafter to as a "fitting direction" or a "releasing direction". Inside the adapter, a laser beam or light advances along an optical axis.

The housing 20a has a connecting portion 30 formed at an inner rear portion to receive the first optical connector plug to be fitted or connected thereto. The fitting portion 29 has one side wall 29a provided with an escape groove portion 25 formed inside thereof and depressed or dented in an elongated rectangular shape. The escape groove portion 25 may be called a cutout portion. The other side wall 29b faced to the one side wall 29a is provided with a key groove portion 22 extending from a front end in the fitting direction. As will become clear later, the key groove portion 22 is adapted to be fitted to a key (for example, 54a in FIG. 7) of the second optical connector plug.

Around the fitting portion 29, there are provided protruding portions 23 protruding outward as stepped portions, grooves 21 adjacent thereto, and projecting portions 24 near the flange 20b. Furthermore, the housing 20a is provided with a pair of locking portions 26 formed on upper and lower inner wall portions thereof, respectively, to lock the second optical connector plug so that the optical connector plug is prevented from being released.

The shutter member 10 is formed from a single thin metal plate and has a main body 11 and a light shielding portion 1. The main body 11 has a connecting portion 17 and forms a contour having a generally rectangular section extending long in a vertical direction. The light shielding portion 1 is made of an elastic plate extending from a center of a long side of the main body 11 at one end in an axial direction opposite to a fitting side fitted to the adapter main body 20 towards the inside of the main body 11. The main body 11 has first and second side plate portions 11a and 11b faced to each other with a space left therebetween.

When the shutter member 10 is fixed to the adapter main body 20, the first side plate portion 11a is faced to an outer surface of the one side wall 29a. Simultaneously, the second side plate portion 11b is faced to an outer surface of the other side wall 29b and covers most part of the key groove portion 22.

The light shielding portion 1 generally obliquely extends across the optical axis of the adaptor. The light shielding portion 1 has a width such that the light shielding portion 1 does not interfere with any part except an inner wall portion inside the adapter main body 20 and that an optical fiber of the first optical connector plug can not be seen. Therefore, a laser beam emitted from the first optical connector plug is blocked by the light shielding portion 1.

The light shielding potion 1 has a streamlined curved shape and has a light shielding part 2 formed at its end, a bent part 3, an intermediate part 4, and a bent part 5, a base part 6, and a connecting part 7 connected to one end of the second side plate portion 11b of the main body 11. The light shielding part 2 has a rounded portion at its end so as to prevent an outer surface of the second optical connector plug from being damaged when the second optical connector plug is inserted into and removed from the adapter main body 20.

The main body 11 of the shutter member 10 has an upper plate portion 11c and a lower plate portion 11d each of which is provided with a wide stopper 14 formed at its center and bent inward at 90 degrees. These stoppers 14 are engaged with the adapter main body 20 in the fitting direction when the shutter member 10 is attached to the adapter main body 20. Each of the upper and the lower plate portions 11c and 11d is provided with a rectangular window 12 formed at its center. At a rear end of each of the windows 12, a locking portion 13 is formed by cutting to extend inward and obliquely frontward. When the shutter member 10 is attached to the adapter main body 20, the locking portions 13 are brought into press contact with upper and lower surfaces of the adapter main body 20 and serve to prevent the main body 11 from wobbling.

Each of the upper and the lower plate portions 11c and 11d of the main body 11 is provided with a rectangular cutout 15 formed at its rear end.

Furthermore, the second side plate portion 11b of the main body 11 is provided with a cutout 16 formed at its front end and serving as an identifying part for identifying presence or absence of the key (for example, 54a in FIG. 7) of the first optical connector plug that is fitted to the key groove portion 22 of the adapter main body 20. The cutout 16 serves to prevent erroneous insertion of a F04 single-core optical fiber connector described in JIS (Japanese Industrial Standards) C 5973. By designing the cutout 16 with a width slightly greater than that of the key groove portion 22 of the adapter main body 20, the key (for example, 54a in FIG. 7) of the second optical connector plug is prevented from being scraped or chipped by the shutter member 10.

Through the cutout 16, only a front end of the key groove portion 22 of the adapter main body 20 is visible. With this structure, a laser beam emitted from the first optical connector plug (not shown) is prevented from leaking out through the key groove portion 22. Specifically, it is assumed that, in the state where the first optical connector plug is fitted to an opening portion at a rear end of the adapter main body 20, the interior of the adapter is tried to be viewed at any angle through an opening portion at a front end. In this event, an end face of the optical fiber connected to the first optical connector plug can not be seen. However, when the second optical connector plug is inserted, the key groove portion 22 can be identified. In such condition, the main body 11 of the shutter member 10 covers the key groove portion 22.

Figure 3:
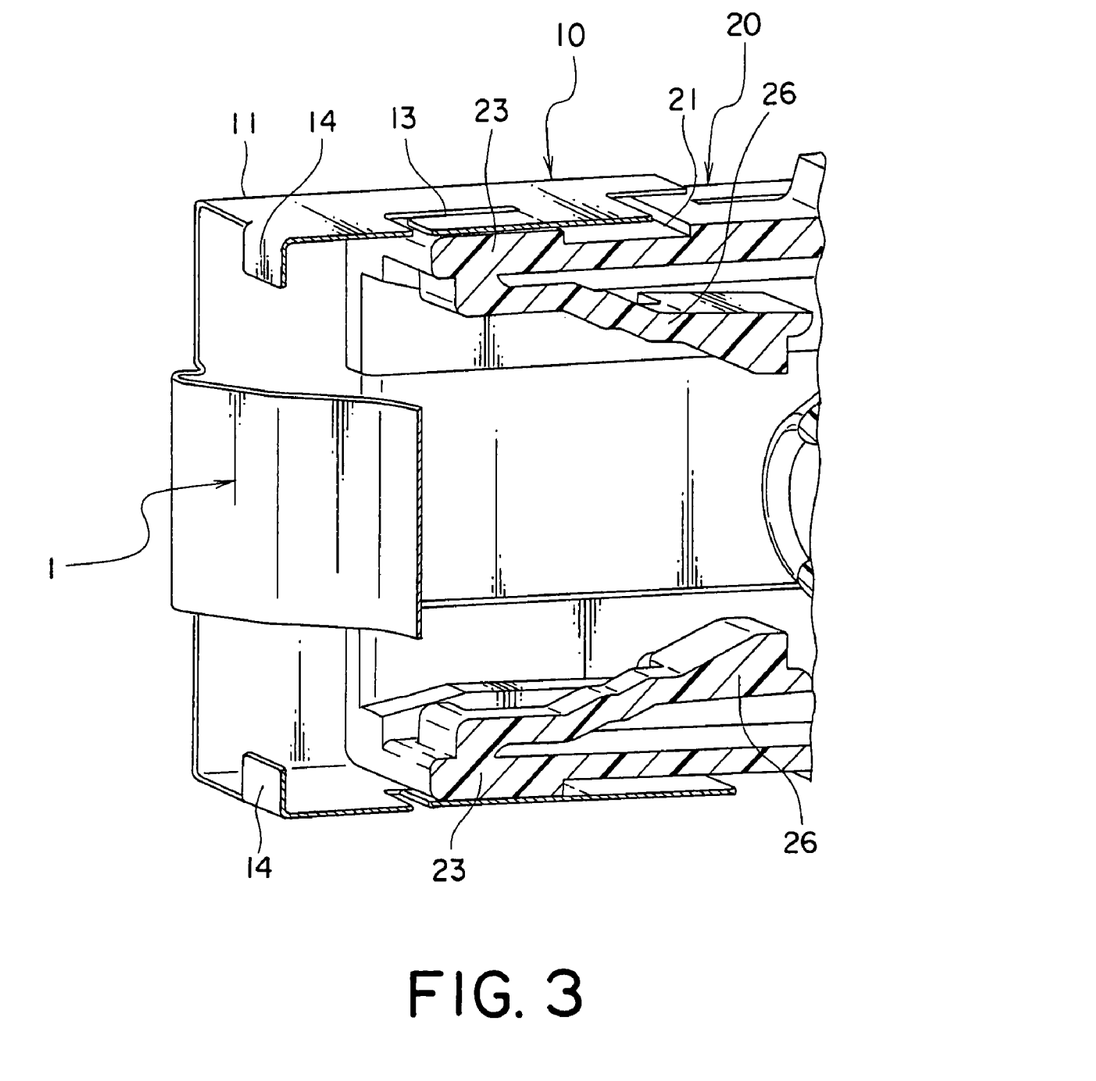
FIG. 3 is a sectional perspective view of the part of the adapter in FIG. 1 during assembling.
Figure 4:
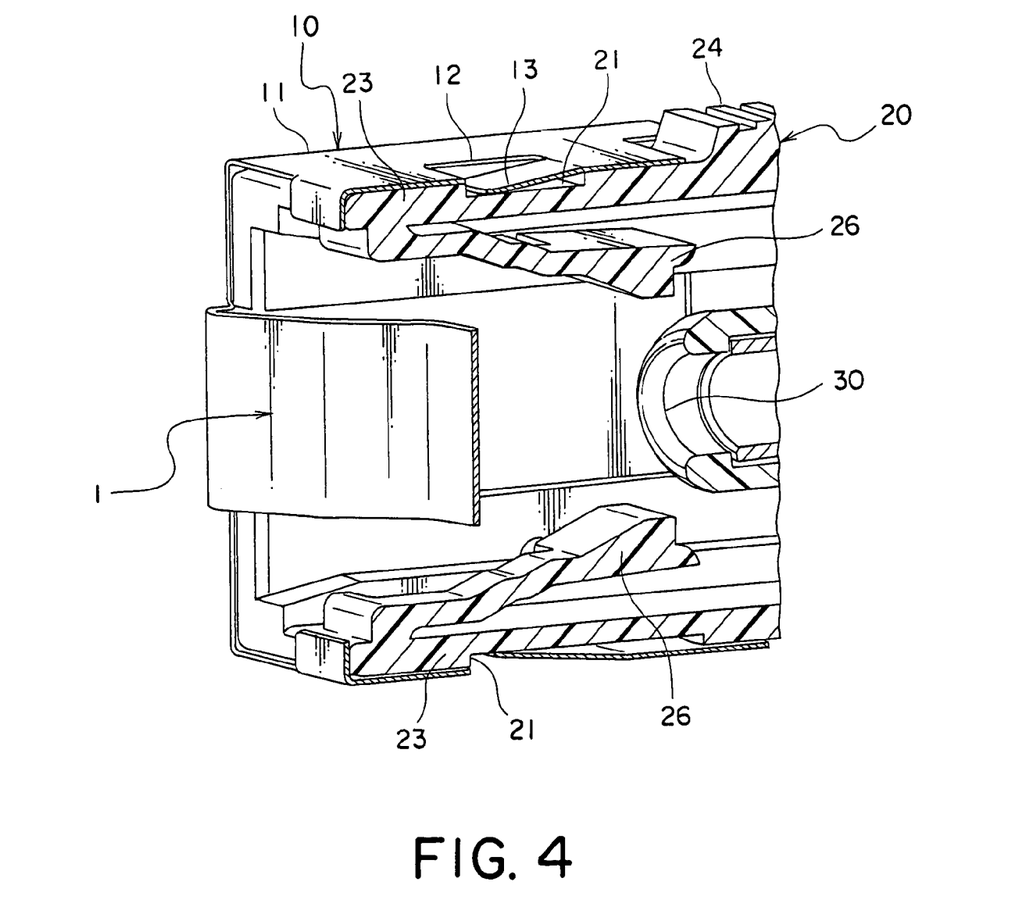
FIG. 4 is a sectional perspective view of the part of the adapter in FIG. 1 after completion of assembling.

Next, referring to FIGS. 2 to 4 in addition, description will be made of an operation of incorporating the shutter member 10 into the adapter main body 20.

Figure 2:
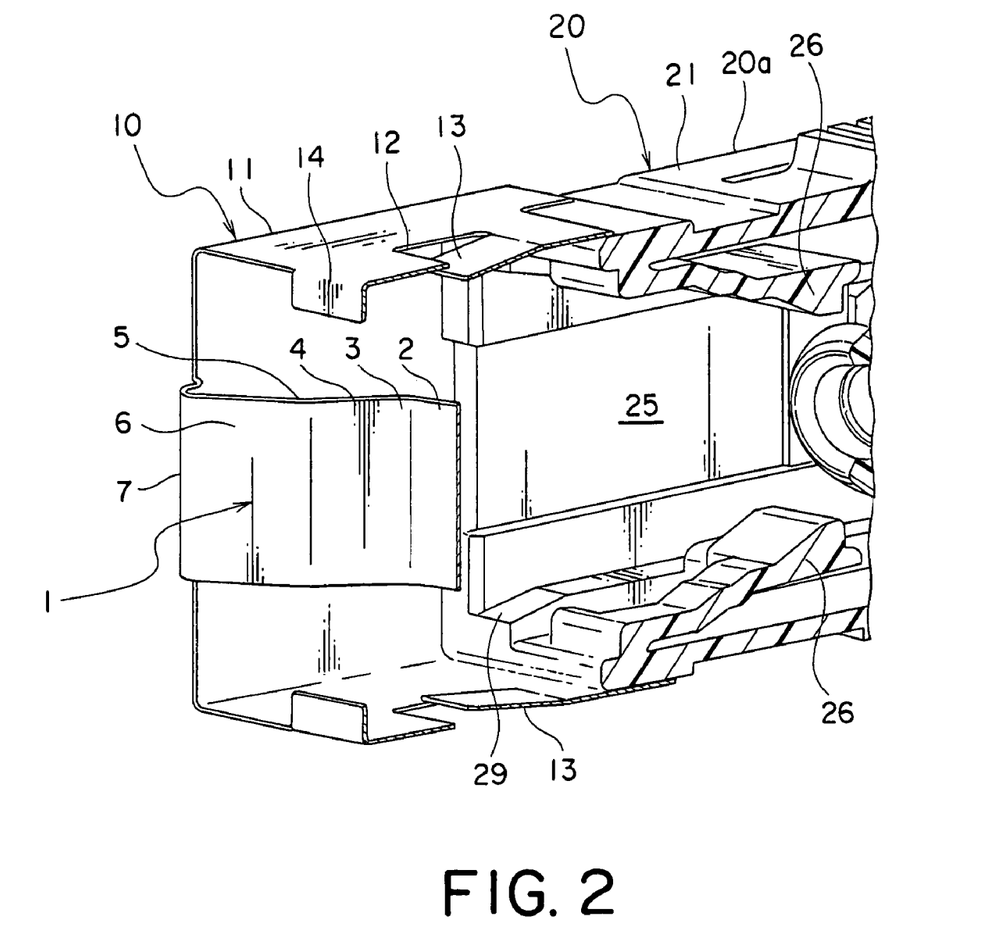
FIG. 2 is a sectional perspective view of a part of the adapter in FIG. 1 at the start of assembling.

As shown in FIG. 2, an opening portion at one end of the shutter member 10 is fitted over the adapter main body 20 in the axial direction so that the main body 11 is located at an outer periphery of the housing 20a. As shown in FIG. 3, the shutter member 10 is further moved in the axial direction. Then, by the protruding portions 23, the locking portions 13 of the shutter member 10 are elastically deformed outward. As shown in FIG. 4, the locking potions 13 are received in the upper and the lower grooves 21 of the adapter main body 20 in a preloaded condition. Therefore, the locking portions 13 prevent the movement of the shutter member 10 in the releasing direction opposite to the fitting direction, i.e., prevent the shutter member 10 from being released from the adapter main body 20. In the above-mentioned state, the stoppers 14 are butted to the protruding portions 23 so as to prevent the shutter member 10 from moving also in the fitting direction.

Thus, it is possible by the locking potions 13 to attach the shutter member 10 in a single-step operation. In a state where the shutter member 10 is attached to the adapter main body 20, the upper and the lower locking portions 13 bent obliquely inward are preloaded, thereby preventing wobbling of the shutter member 10.

Figure 5:
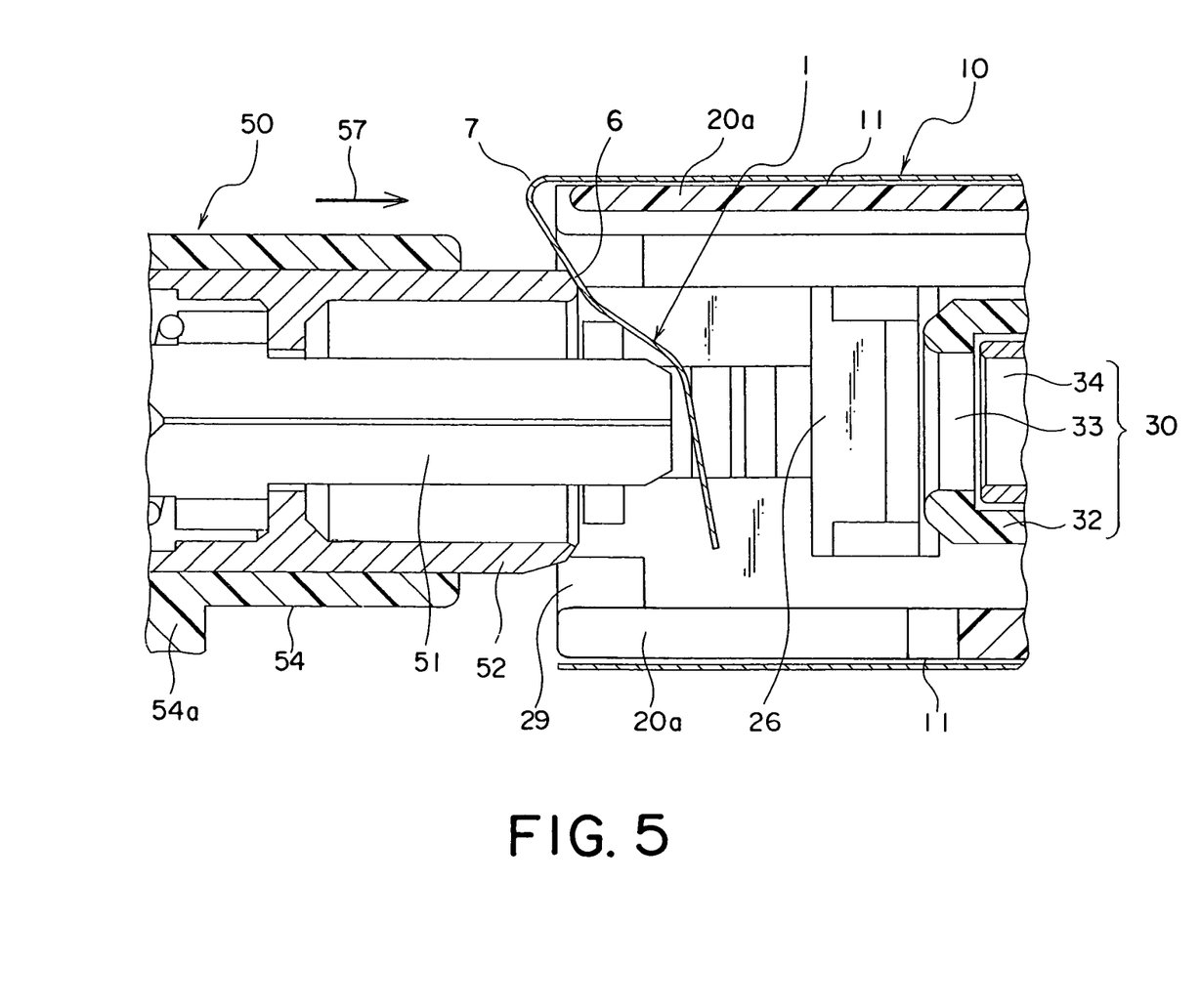
FIG. 5 is a vertical sectional view of the adapter in FIG. 4 and an optical connector plug to be fitted thereto before they are fitted to each other.

Referring to FIG. 5, description will be made of an operation of fitting the above-mentioned adapter to an optical connector plug 501 as one example of the second optical connector plug.

As illustrated in FIG. 5, the optical connector plug 501 comprises a ferrule 51, an outer cylindrical portion 52 receiving the ferrule 51, and the housing 54 around the outer cylindrical portion 52. The outer cylindrical portion 52 has an axial end portion protruding from the housing 54. The housing 54 is provided with the key 54a comprising a projecting portion to be fitted to the key groove portion 22 of the adapter main body 20. Inside the adapter main body 20, a holding portion 32 having a fitting hole 33 to receive the ferrule 51 fitted thereto and a connecting cylindrical portion 34 are arranged as a connecting portion 30.

As depicted by an arrow 57, the optical connector plug 501 is fitted to the fitting portion 29 of the adapter main body 20. Then, at first, an end of the outer cylindrical portion 52 is brought into contact with the base part 6 of the light shielding portion 1 of the shutter member 10. Following the progress of fitting of the optical connector plug 501, the light shielding portion 1 is pressed by the outer cylindrical potion 52 and elastically deformed to be rotated inward around the connecting part 7 as a pivot axis. At this time, the light shielding portion 1 is not brought into contact with an end of the ferrule 51. When the optical connector plug 501 is completely fitted to the adapter main body 20, the light shielding portion 1 of the shutter member 10 is received in the escape groove portion 25 formed on an inner wall of the adapter main body 20. When the optical connector plug 501 is fitted, the light shielding portion 1 is pressed by the outer cylindrical portion 52. Therefore, the shutter member 10 is not brought into direct contact with the ferrule 51. Accordingly, the ferrule 51 is hardly contaminated.

When the optical connector plug 50 is removed, the light shielding portion 1 is returned into an original shape due to its elastic restoring force. As a result, the light shielding portion 1 is returned to a position crossing the optical axis of the adapter.

Figure 6:
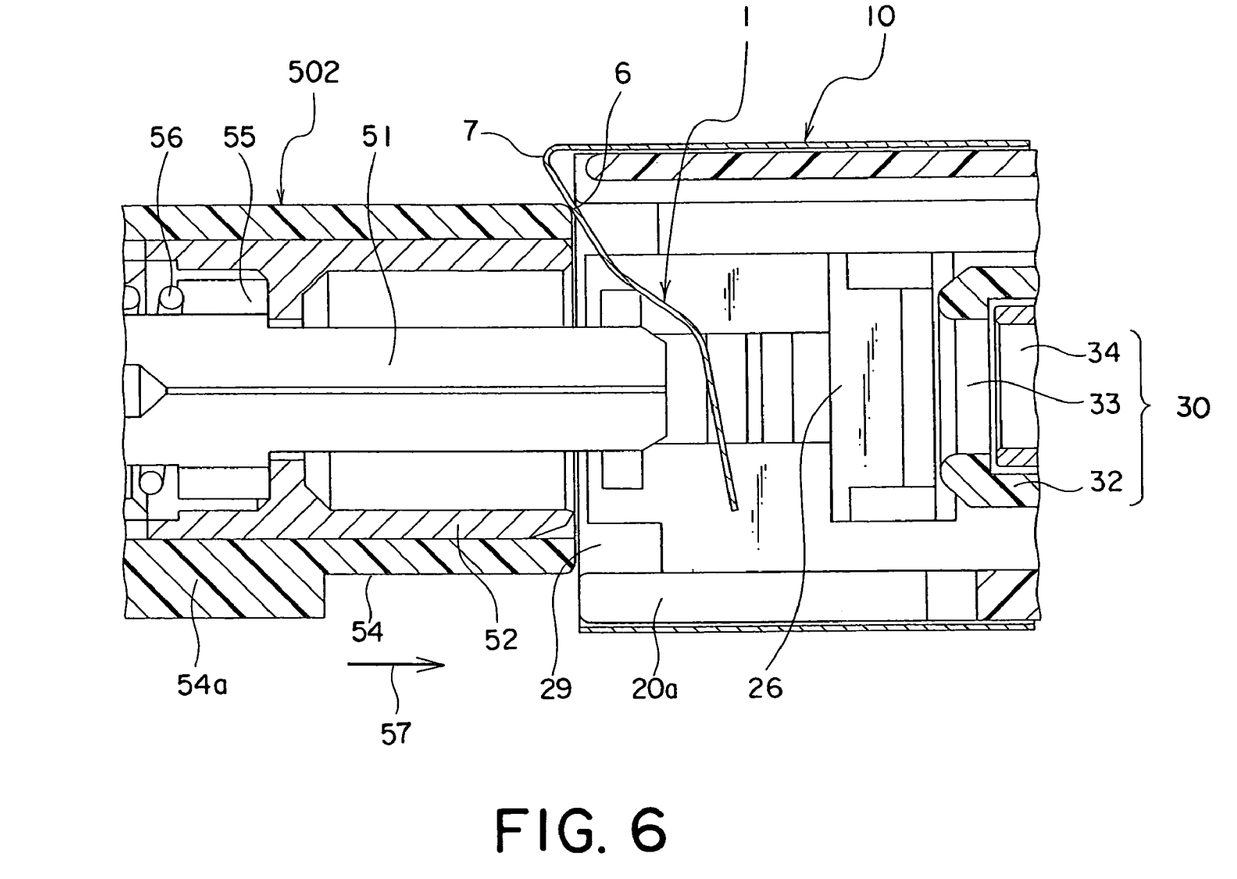
FIG. 6 is a vertical sectional view of the adapter in FIG. 4 and another optical connector plug to be fitted thereto before they are fitted to each other.

Referring to FIG. 6, description will be made of an operation of fitting the above-mentioned adapter to an optical connector plug 502 as another example of the second optical connector plug.

In the optical connector plug 502 illustrated in FIG. 6, an axial end of the outer cylindrical portion 52 is substantially coincident with an axial end of the housing 54. As depicted by an arrow 57, the optical connector plug 502 is fitted to the fitting portion 29 of the adapter main body 20. Then, at first, the housing 54 is brought into contact with the base part 6 of the light shielding portion 1. With the progress of fitting of the optical connector plug 502, the light shielding portion 1 is pressed by the housing 54 and elastically deformed to be rotated inward around the connecting part 7 as a pivot axis. At this time, the light shielding portion 1 is not brought into contact with the end of the ferrule 51. When the optical connector plug 501 is completely fitted to the adapter main body 20, the light shielding portion 1 of the shutter member 10 is received in the escape groove portion 25 formed on the inner wall of the adapter main body 20. When the optical connector plug 502 is fitted, the light shielding portion 1 is pressed by the housing 54. Therefore, the shutter member 10 is not brought into direct contact with the ferrule 51. Therefore, the ferrule 51 is hardly contaminated.

When the optical connector plug 50 is removed, the light shielding portion 1 is returned into an original shape due to its elastic restoring force. As a result, the light shielding portion 1 is returned to a position crossing the optical axis of the adapter.

In the above-mentioned adapter, a side surface of the inner wall of the adapter main body 20 is thinned to the extent that the light shielding portion 1 can be received. Thus, the escape groove portion 25 is formed on the adapter main body 25. Accordingly, the shutter member 10 can be attached to an end face of an adapter CNF04PAFB, CNF04PAFC, CNF04PAFB-1, CNF04PAFC-1 for a F04 single-core optical fiber connector described in JIS C 5973 that is opposite to a plate-mount side known in the art.

The shutter member 10 has a hollow box-like shape. With this structure, it is possible to prevent leakage of a laser beam through the key groove portion 22 on the side surface of the adapter main body 20 or to prevent penetration of light through the key groove portion 22. Further, the main body 11 of the shutter member 10 is attached to the outside of the housing of the adapter main body 20 to surround the outer periphery of the adapter main body 20. With this structure, the optical connector plug 50 can be inserted and removed without difficulty.

In a case where the adapter main body 20 has plate-mount grooves known in the art, it is possible to use the plate-mount grooves as the grooves 21 for a shutter locking portion. Thus, the shutter member 10 can be attached without changing an outer shape of the adapter main body 20.

The above-mentioned shutter member 10 may be attached to a conventional adapter. By forming the shutter member 10 by press-working a single thin metal plate, it is possible to reduce the size and the cost.

The inner wall of the adapter main body 20 is thinned or slightly cut away to the extent that the light shielding portion 1 can be received. With this structure, it is possible to provide an inexpensive adapter having a shutter without changing or increasing an outer dimension.

Another adapter may be arranged on a rear surface of the above-mentioned adapter to be butted thereto. In this case, the first and the second optical connector plugs are fitted to these adapters to be butted to each other inside the adapters. Thus, the first and the second optical connector plugs can be optically connected to each other. Another adapter may comprise the shutter member 10 like the above-mentioned adapter. Alternatively, another adapter may have no shutter member.

While the present invention has thus far been described in connection with the preferred embodiment thereof, it will readily be possible for those skilled in the art to put this invention into practice in various other manners. In the foregoing, description has been directed to the adapter for use in optical connection of the optical connector plug. However, this invention may be similarly put into practical use in an optical connector comprising an optical connector plug having an integral component corresponding to an adapter. In the latter case, a so-called optical connector with a shutter can be provided.

What is claimed is:

1. An optical connection component which is for use in connecting a connection object comprising a key formed on one side surface and which has an optical axis, the optical connection component comprising:
    a housing which is formed around the optical axis and is for fitting over the connection object; and
    a shutter member which is formed by a thin metal plate and is coupled to the housing;
    the shutter member comprising:
    a light shielding portion which is elastically deformable and extends across the optical axis;
    a main body which is formed integral with the light shielding portion and is fitted over the outside of the housing; and
    a locking portion which is formed integral with the main body, the locking portion preventing the shutter member from being released from the housing when the main body is fitted over the housing;
    the housing comprising:
    a key groove portion for receiving the key, the key groove portion extending between an inside portion and an outside portion of the housing but being covered externally by the main body of the shutter member; and
    an escape groove portion adapted to receive the light shielding portion in an elastically deformed state.

2. The optical connection component according to claim 1, wherein the housing comprises a pair of side walls which are faced to each other with a space left therebetween, the key groove portion is formed on one of the side walls, and the escape groove portion is formed on the other side wall.

3. The optical connection component according to claim 2, wherein the light shielding portion obliquely extends from the vicinity of the other side wall towards the one side wall.

4. The optical connection component according to claim 1, wherein the housing has a generally rectangular section, the shutter member further comprises a main body which is coupled to the light shielding portion and is attached to the housing, and the main body has a generally rectangular section and is fitted over the outside of the housing.

5. The optical connection component according to claim 4, wherein the main body comprises:
- a first side plate portion covering the key groove portion; and
- a second side plate portion which is faced to the first side plate portion with a space left therebetween,
- wherein the light shielding portion obliquely extends from the second side plate portion towards the first side plate portion.

6. The optical connection component according to claim 5, wherein the first side plate portion has an identifying portion which is formed at a position corresponding to the key groove portion to identify erroneous insertion of the connection object.

7. The optical connection component according to claim 4, wherein the main body has engaging means to be engaged with the housing in a direction parallel to the optical axis.

* * * * *